United States Patent [19]

Hansen et al.

[11] Patent Number: 5,263,724
[45] Date of Patent: Nov. 23, 1993

[54] SEGMENTED SEAL FOR ROTARY EQUIPMENT

[75] Inventors: Ib T. Hansen, Naerum; Nils V. Andersen, Gilleleje, both of Denmark

[73] Assignee: Volund Miljoteknik A/S, Brondby, Denmark

[21] Appl. No.: 847,096
[22] PCT Filed: Nov. 2, 1989
[86] PCT No.: PCT/DK89/00257
   § 371 Date: Jun. 2, 1992
   § 102(e) Date: Jun. 2, 1992
[87] PCT Pub. No.: WO91/06794
   PCT Pub. Date: May 16, 1991
[51] Int. Cl.$^5$ .......................... F16J 15/16; F16J 15/34
[52] U.S. Cl. ........................ 277/30; 277/144; 277/192; 277/96.1; 432/115
[58] Field of Search ............... 277/30, 815, 83, 84, 277/91, 96.1, 97, 100, 144, 145, 154, 174, 190, 191, 192, 194; 432/115

[56] References Cited

U.S. PATENT DOCUMENTS

| | | | |
|---|---|---|---|
| 1,500,589 | 7/1924 | Lundberg | 277/96.1 X |
| 1,899,630 | 2/1933 | Nelson | 277/84 |
| 2,659,588 | 11/1953 | Blanchard | 423/115 |
| 3,098,659 | 7/1963 | Shepler | 277/144 |
| 3,383,115 | 5/1968 | Eckley et al. | 277/192 X |
| 4,212,474 | 7/1980 | Arai | 277/83 |
| 4,252,331 | 2/1981 | Siegel | 277/144 |
| 4,342,555 | 8/1982 | Bohanszky | 423/115 |
| 4,405,137 | 9/1983 | Webb | 277/153 |
| 4,502,702 | 3/1985 | Nixon, Jr. | 277/101 |
| 4,554,748 | 11/1985 | Nixon, Jr. | 277/101 X |

FOREIGN PATENT DOCUMENTS

| | | | |
|---|---|---|---|
| 167658 | 6/1965 | U.S.S.R. | 277/144 |
| 1486728 | 6/1989 | U.S.S.R. | 423/115 |
| 2397 | 9/1870 | United Kingdom | 423/115 |
| 204789 | 10/1923 | United Kingdom | 277/84 |
| 759627 | 10/1956 | United Kingdom | 277/84 |

*Primary Examiner*—William A. Cuchlinski, Jr.
*Assistant Examiner*—Scott W. Cummings
*Attorney, Agent, or Firm*—Ladas & Parry

[57] ABSTRACT

A sealing assembly for effecting a rotary seal between a stationary housing (5) and a rotary drum (1) by a number of arcuate sealing segments (8) engaging a radial sealing surface (6) on the housing (5) and a non-radial sealing surface (3) on the rotary drum (1), the segments being urge into sealing engagement with the sealing surfaces by a constantly acting radial force. The non-radial surface (3) tapers conically towards the radial surface (6). With this arrangement, the radially acting force, such as produced by a cable (15), urging the segments (8) radially inwards, also provide the requisite force for urging the segments towards the radial sealing surface (6), as the reaction force on the non-radial or conical surface (3) has a component directed towards the radial sealing surface (6).

7 Claims, 2 Drawing Sheets

5,263,724

SEGMENTED SEAL FOR ROTARY EQUIPMENT

TECHNICAL FIELD

The present invention relates to a sealing assembly of a pair of relatively rotatable members.

BACKGROUND ART

In known assemblies of this kind, one set of axially acting urging means have been used for urging arcuate sealing segments into sealing engagement With the sealing surface on the first member, said first member usually being stationary, whereas another set of radially acting urging means have been used for urging the arcuate sealing segments into sealing engagement with the sealing surface on the second member, usually a rotary member.

Sealing assemblies of this kind are often used for sealing the ends of large or very large rotary drums, such as those used in rotary kilns and the like. Because of the large size it is often necessary to use a large number of sealing segments, such as twelve or more. This means, of course, that a corresponding number of axially acting urging means for each sealing segment will be required.

DISCLOSURE OF THE INVENTION

It is the object of the present invention to provide a sealing assembly of the kind initially referred to, in which the mechanism for urging the sealing segments into sealing engagement with the various sealing surfaces is considerably simplified and hence more reliable in operation and less costly to produce, and this object is achieved with a sealing assembly of the kind referred to above, which according to the present invention is characterized by characterized by an arrangement wherein a single urging means is employed which acts on the arcuate sealing segments and produces two components of force, one acting axially to press the arcuate sealing segments against one of the sealing surfaces, while the other acts to press the arcuate sealing segments against the other of the sealing surfaces. The generation of the components is produced by forming one of the sealing surfaces at an acute angle relative to the axis of rotation of the relatively rotatable first and second members.

With this arrangement, the radially acting urging means are used for urging the sealing segments into engagement both with the sealing surfaces on the first member and the sealing surfaces on the second member.

BRIEF DESCRIPTION OF THE DRAWING

In the following detailed description the present invention is explained with reference to the drawing, in which.

DETAILED DESCRIPTION OF THE PREFERRED EMBODIMENT

Figure 1:
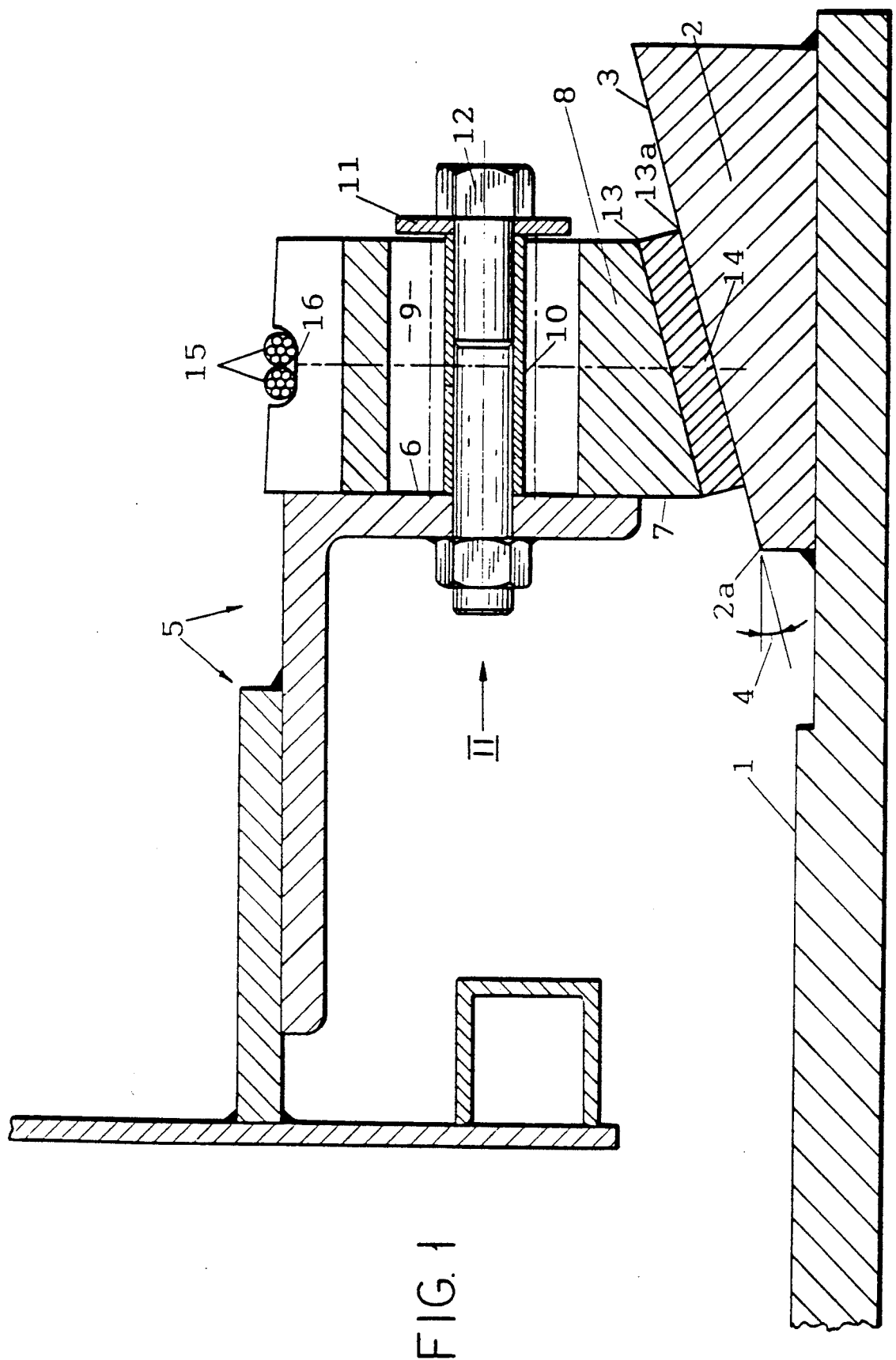
FIG. 1 is a sectional view of a part of a rotary drum and a part of a stationary housing cooperating with said drum to form a seal therebetween.
Figure 2:
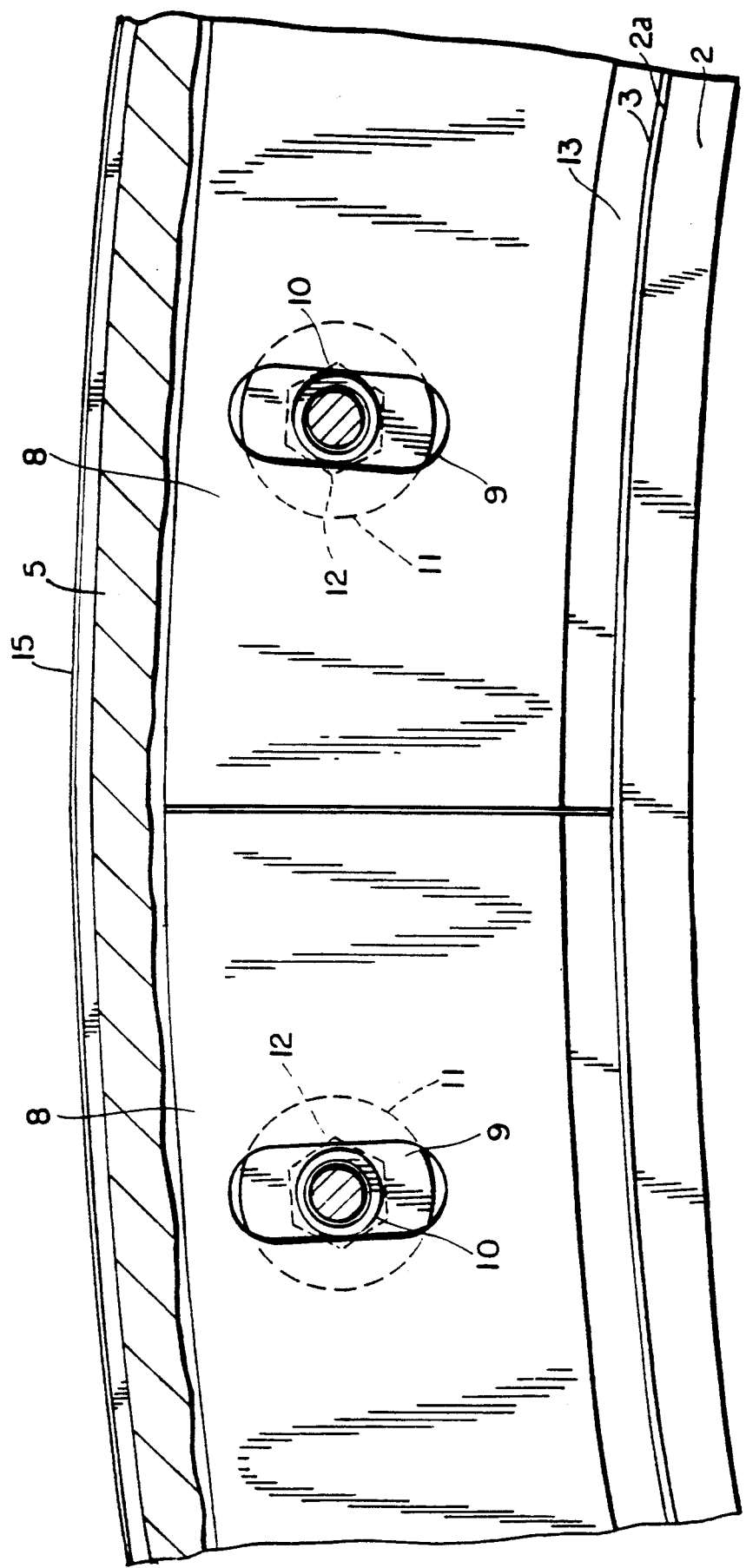
FIG. 2 is an end view, partly broken away, of a portion of the structure in FIG. 1 taken in the direction of arrow II in FIG. 1.

One end of a rotary drum 1 of a rotary kiln is provided on its outside with a sealing ring 2, the latter being welded to the outside of the drum 1 and having on outside conical sealing surface 3; in the example shown surface 3 forms an oblique angle 4 of substantiall 15 degrees with the axis of rotation (not shown) of the rotary drum 1.

The drawing also shows that end of a stationary housing 5, with which the rotary drum 1 cooperates to form a sealed joint.

On the side of the housing 5 facing to the right in FIG. 1 of the drawing there is formed a substantially radially extending sealing surface 6 cooperating with a sealing surface 7 on one of a number of sealing segments 8 each extending in continuation of each other all the way around the sealing ring 2 on the drum 1.

In each sealing segment 8 there is formed a "long hole" or slot 9, through which extends a tubular bushing 10. As seen in FIG. 1, the sleeve or bushing 10 is slightly longer than the thickness in the axial direction of its sealing segment 8, so that there is a slight distance in the operating condition shown from the right-hand side of the segment 8 to the opposing side of a disk 11 being held in the position shown by a bolt 12 also holding the bushing 10 securely in position relative to the housing 5.

On the side facing the rotary drum 1, each segment 8 is provided with a sealing pad 13 of metal or other material suitable for sliding engagement with the sealing surface 3 on the sealing ring 2.

The side of the sealing pad 13 facing the sealing ring 2 forms a sealing surface 14 cooperating sealingly with the sealing surface 3.

In the operating condition, all the sealing segments 8 are held in sealing engagement with the sealing ring 2 by suitable, permanently acting means, in the example shown, a comprises cable 15 engaging in suitable grooves or notches on the side of each segment 8 facing away from the rotary drum 1. The cable 15, which should extends at least once around the set of segments 8, is constantly held under tension by suitable means, such as springs or weights (not shown).

The reaction force created by the force, with which the cable 15 urges each sealing segment 8 towards the sealing ring 2, will comprise a component directed to the left in FIG. 1, i.e. a component urging the sealing surface 7 of each sealing segment 8 into sealing engagement with the sealing surface 6 on the housing 5. The reason for this is, of course, the oblique angle 4 that the mating sealing surfaces 3 and 14 makes with the axis of rotation of the rotary drum 1.

In operation, the drum 1 may expand or contract both in the radial and the axial directions, resulting in corresponding changes of position of the sealing surface on the sealing ring 2. Due to the considerable radial dimension of the "long hole" or slot 9, the sealing segments S are able to follow any such change in position, and also to follow any irregularities in the sealing surface 3 during the rotary movement of the drum 1.

As will be evident from the above, the disk 11 does not serve to hold the sealing segment 8 in position during normal operation. When, however, the part of the rotary drum 1 shown is to be moved to the right and/or the part of the housing 5 shown is to be moved to the left, thus making the seal inoperative, the disk 11 serves to prevent the sealing segment 8 from being pulled away from the sealing surface 6 by more than a few millimeters.

When the drum 1 and the housing 5—or the parts of same shown in the drawing—have been moved away from each other in the direction mentioned, the tension in the cable 15 will have moved the sealing segments 8 radially inward, until the radially outermost part of each slot 9 abuts against the bushing 10, thus preventing further radially inward movement. With suitable dimensioning of the various components, the movement will be halted in a position, in which the right-hand edges 13a of the sealing pads 13 will lie on a circle with a greater radius than the circle, on which the left-hand edges 2a of the sealing ring 2 are situated. Thus, it is not necessary to move all the sealing segments 8 radially outwards to permit the entry of the sealing ring 2 between them, as the sealing ring 2 with its conical surface 3 will force the sealing segments 8 apart, eventually to take up a position like the one shown in the drawing.

We claim:

1. In a sealing assembly for effecting a seal between a first member (5) and a second member (1) adapted to rotate relative to each other about an axis, said assembly comprising:
   a) a substantially radial first sealing surface (6) on said first member (5),
   b) a plurality of arcuate sealing segments (8) each having a first sealing surface (7) cooperating sealingly with said first sealing surface (6) on the first member (5) and a second sealing surface (14) cooperating sealingly with
   c) a second, non-radial sealing surface (3) on said second member (1), and
   d) urging means (15) urging the arcuate sealing segments (8) into sealing engagement with the first sealing surface (6) on the first member (5) and into sealing engagement with the second sealing surface (3) on the second member (1),
   e) the second sealing surface (3, 14) on the second member (1) and on each sealing segment (8) are disposed at an angle (4) relative to said axis of rotation to produce a first component of the reaction force created by the urging means (15) urging the sealing segment against the second sealing surface (3) on the second member (1) and a second component urging the sealing segment (8) against the first sealing surface (6) on the first member (5), and
   f) means (11) normally out of engagement with the arcuate sealing segment (8) for limiting the extent of their movement away from the first member (5), said means (11) comprising a fastener extending axially through each sealing segment and abutting against said first member, a sleeve within an aperture in said arcuate segment surrounding said fastener, said sleeve having one end abutting against said first member, and a disk abutting against said sleeve at an opposite end thereof, said disk being axially spaced from said arcuate segment and being engaged by said fastener to maintain said disk, said sleeve and said first member in abutting relation with one another.

2. A sealing assembly according to claim 1 in which
   a) in operation the first member (5) is substantially stationary and the second member (1) extends through the first member and rotates relative thereto about said axis of rotations, and
   b) the second sealing surface (3) on the second member (1) faces generally radially outwards, wherein:
   c) said second sealing surface (3) on the second member (1) converges in the direction toward the first sealing surface (6) on the first member (5) at said angle (4) with said axis of rotation.

3. A sealing assembly according to claim 1 wherein said angle (4) is between 5-25 degrees.

4. A sealing assembly according to claim 1 comprising means for limiting the extent of radial movement of the arcuate sealing segments (8) in the direction, in which they are urged by said urging means (15) such that when the first or second member is withdrawn axially from the other member in the direction of said angle (4), the sealing segments (8) will not prevent the first and second member (5, 1) from being displaced in their relative operation position.

5. A sealing assembly according to claim 1, wherein said aperture in each said arcuate member is radially elongated to permit relative radial movement between said arcuate member and said fastener.

6. A sealed assembly comprising first and second members adapted for relative rotation about an axis of rotation, said first member having a sealing surface extending perpendicularly to said axis of rotation, said second member having a sealing surface extending at an acute angle relative to said axis of rotation, arcuate sealing segments extending around said axis of rotation and each having first and second sealing surfaces respectively in sealing contact with the sealing surfaces of said first and second members, urging means acting on said sealing segments in a direction perpendicular to said axis of rotation to produce first and second components of force respectively urging said first and second sealing surfaces of the arcuate sealing segments into sealing contact with the respective sealing surfaces of said first and second members, and fastener means holding said arcuate segments and said first member with clearance in a direction parallel to said axis of rotation for limited relative movement.

7. A sealed assembly as claimed in claim 6, wherein said fastener means is fitted in said arcuate segments with clearance in a direction perpendicular to said axis of rotation to provide relative movement of said arcuate segments with respect to said second member.

* * * * *